(12) United States Patent
Yamada

(10) Patent No.: US 6,762,818 B2
(45) Date of Patent: Jul. 13, 2004

(54) LIQUID CRYSTAL DISPLAY DEVICE AND COLOR FILTER SUBSTRATE THEREOF

(75) Inventor: Tsutomu Yamada, Tainan (TW)

(73) Assignee: Chi Mei Optoelectronics, Tainan (TW)

( * ) Notice: Subject to any disclaimer, the term of this patent is extended or adjusted under 35 U.S.C. 154(b) by 272 days.

(21) Appl. No.: 10/076,935

(22) Filed: Feb. 19, 2002

(65) Prior Publication Data

US 2003/0156236 A1 Aug. 21, 2003

(51) Int. Cl.$^7$ ..................... G02F 1/1335; G02F 1/1339
(52) U.S. Cl. ........................ 349/155; 349/106
(58) Field of Search ................. 349/106, 155, 349/156, 110, 111

(56) References Cited

U.S. PATENT DOCUMENTS

| 5,757,451 | A | | 5/1998 | Miyazaki et al. |
| 5,969,784 | A | * | 10/1999 | Miyazaki et al. ........... 349/155 |
| 6,147,729 | A | | 11/2000 | Kurauchi et al. |
| 6,275,280 | B1 | * | 8/2001 | Kajita et al. ................. 349/155 |
| 6,509,948 | B2 | * | 1/2003 | Suzuki ........................ 349/155 |

FOREIGN PATENT DOCUMENTS

| EP | 0 884 626 A2 | 6/1998 |
| EP | 1 030 211 A2 | 2/2000 |

\* cited by examiner

Primary Examiner—Toan Ton
(74) Attorney, Agent, or Firm—Lowe Hauptman Gilman & Berner LLP (57) ABSTRACT

A color filter substrate for a LCD device comprises a transparent substrate having a substantially flat surface, a black matrix, a color filters portion, an electrode, a plurality of spacers, and an alignment film. The color filter portion having a plurality of colored layers disposed on the transparent substrate. The plurality of spacers each having a first spacer member and a second spacer member, wherein the first spacer member and the second spacer member are formed by different layers in the shape of a parallel construction, and overlap and intersect at an angle such that each of the spacers has an uniform height.

29 Claims, 7 Drawing Sheets

LIQUID CRYSTAL DISPLAY DEVICE AND COLOR FILTER SUBSTRATE THEREOF

BACKGROUND OF THE INVENTION

1. Field of the Invention

The present invention generally relates to a liquid crystal display device, and more particularly, a liquid crystal display device having spacers with uniform height to maintain the uniform and precise cell gap between the two glass substrates of liquid crystal display device.

2. Description of the Related Art

A liquid crystal display device typically includes a pair of substrates which are maintained in a space apart, yet parallel relationship with one another. The space between the substrates is commonly referred to as the cell gap. Interposed between the substrates, within the cell gap, is a liquid crystal material which changes its optical characteristics in response to an applied electrical signal.

A plurality of electrodes are disposed upon the inner surface of the substrates in order to control and apply the desired electrical signals to the liquid crystal material. Some LCD devices will have an electrode arrangement which allows a predetermined set of characters or symbols to be generated, while other LCD devices have a matrix of electrodes that form a display comprised of a great plurality of individually accessible pixel elements, each of which may be selectively activated to form an infinite variety of images.

Due to the electro-optical characteristics inherent in the liquid crystal material, its state varies with the application of an electrical signal state varies. For example, some liquid crystal materials will assume a reflective state when no electrical signal is applied, and will assume a transmissive state under the influence of an applied electrical signal. Some new liquid crystal materials perform with a variety of different gray levels as well.

In order to assure the proper operation of a liquid crystal display device, it is critical that the cell gap is maintained uniformly and precisely throughout the entire display. Even slight deviations in the cell gap will result in a noticeable and defective appearance in the display (so-called Mura defect). This can readily be seen in a conventional LCD display panel with a fingertip pressure on the surface. In response to the pressure, the cell gap in the affected area will be reduced slightly, resulting in a dark spot, degradation of contrast or other undesirable defects in the displayed image.

In a conventional technology, the LCD device includes a TFT substrate, a color filter substrate and liquid crystal material sandwiched therebetween. The cell gap is maintained by providing a plurality of spacers between the substrates. The spacers, which are of a uniform height, are disposed randomly within the cell gap, by virtue of a spraying technique. This generally results in an uneven distribution of spacers. To ensure that an adequate concentration of spacers to maintain the proper cell gap is disposed in all areas of the display, a superfluity of spacers must be used. In addition, according to such conventional techniques for placement of the spacers, they are placed in both "inactive" and "active" areas of the display. The "active" areas are those areas where the liquid crystal material may be selectively activated because they are located between opposed electrodes upon the substrates. The "inactive" areas are those areas where the liquid crystal material cannot be selectively activated because of the absence of opposed electrodes on the substrates.

Inherently, there are several undesirable deficiencies in the structure and performance of the liquid crystal display panel existing in such conventional spacer techniques. Spacers which are disposed in the active display areas, particularly due to the superfluity of spacers, cause defects, such as the degradation of contrast or the undesirable emission of light around the edges of the spacers therein.

Therefore, European Patent 1030211 A2, incorporated herein by reference, discloses a liquid crystal display, which can omit the step of scattering spacers and thus avoiding deviations in cell thickness due to the uneven distribution of spacers. This LCD generally includes a TFT (Thin Film Transistor) substrate, a CF (Color Filter) substrate and a liquid crystal material layer sealed therebetween. The projection patterns formed on the CF substrate have a height of about 4.0 $\mu$m to keep the uniform cell gap. However, it is necessary to form the projection patterns by extra processes of applying, exposing and developing a photoresist disposed on the electrode layer, which may cause the substantial increase in cost.

U.S. Pat. No. 5,757,451 entitled "Liquid Crystal Display Device Spacers Formed From Stacked Color Layers" issued on May 26, 1998 to Miyazaki et al., incorporated herein by reference, discloses a pillar-shaped spacer disposed by stacking of a plurality of different color filter layers on a substrate of the LCD device for keeping a cell gap thereof. Also, U.S. Pat. No. 6,147,729 entitled "LCD Having Stacked Color Filter Spacers In Which Some Spacers Are Continuous With A Color Filter Layer And Others Are Not" issued on Nov. 14, 2000 to Kurauchi et al., incorporated herein by reference, discloses another stacked color filter spacers for keeping a cell gap of a LCD device.

Figure 1:
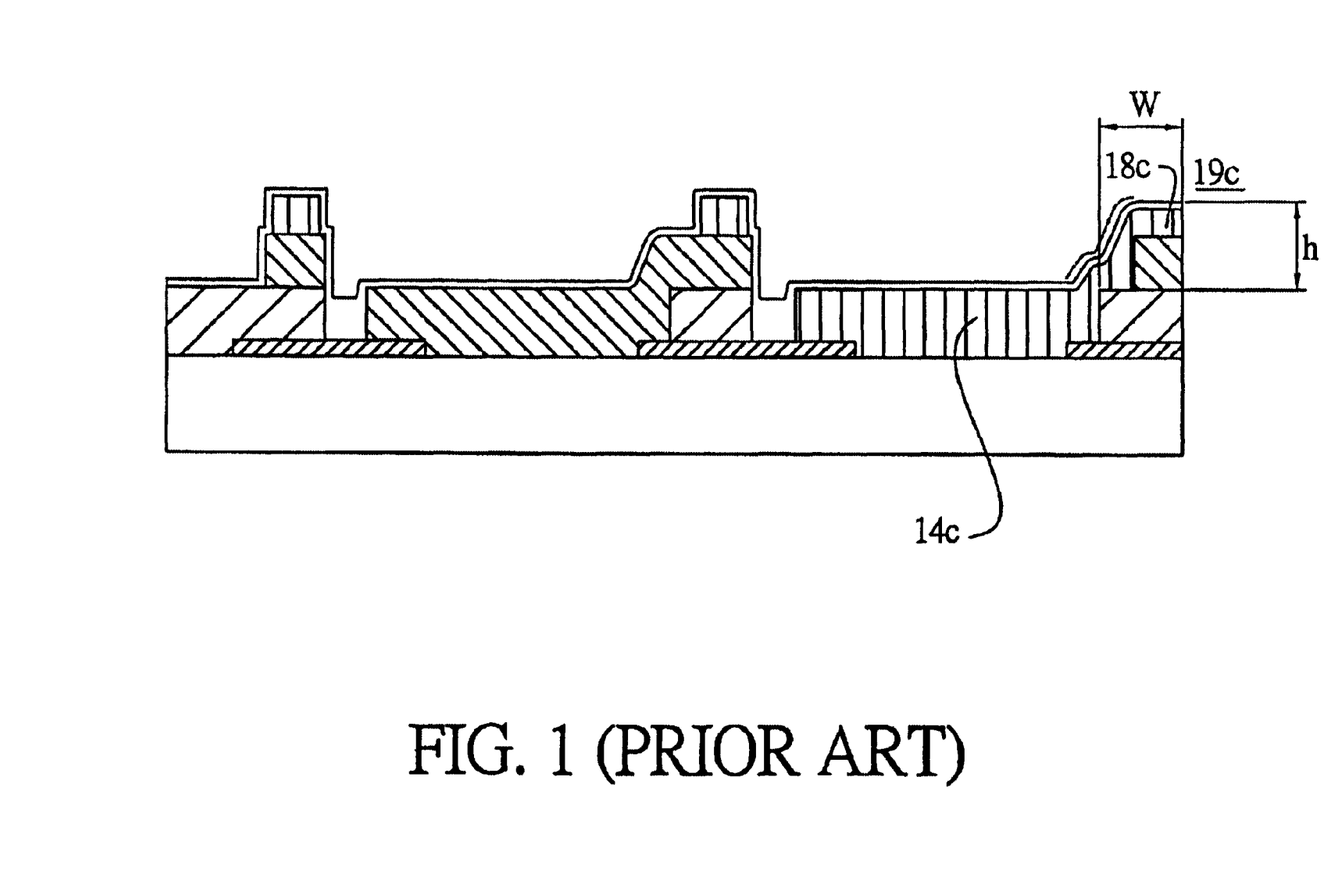
FIG. 1 is a cross sectional schematic view of a color filter substrate of a conventional LCD device.

However, the spacers as mentioned above still have some problems. First, the spacers shown in FIG. 1 are formed in such a manner that the uppermost layer 18c of the spacer portion and the colored layer 14c on the pixel area are continuous, i.e., it is difficult to control the width W and the height h of the spacer portion of the space 19c. Since the increase of the width W may cause the spacer portion to enter into the pixel region, the open ration will be reduced, and the uneven cell gap may be created due to variation in the height h of the spacer.

Figure 2A:
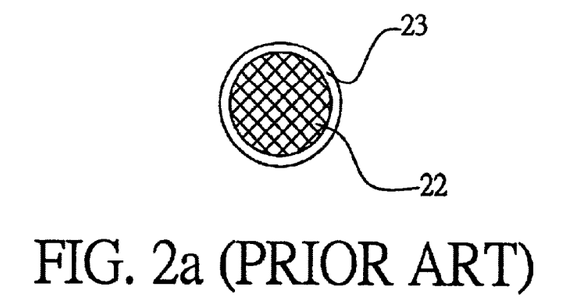
FIGS. 2a and 2b are a top view and a cross sectional view of a stacked color filter spacer, respectively.
Figure 2B:
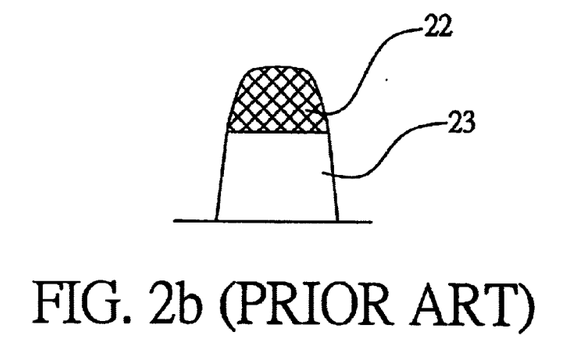
Figure 3A:
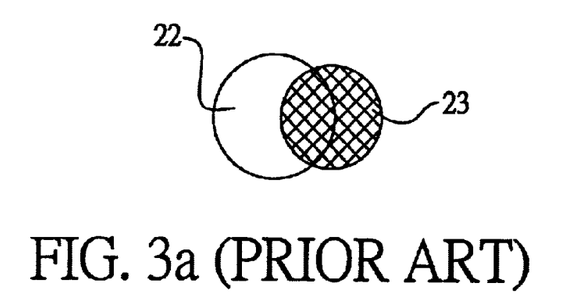
FIGS. 3a and 3b are a top view and a cross sectional view of a stacked color filter spacer, respectively, in which the two stacked color filters are misaligned with each other.
Figure 3B:
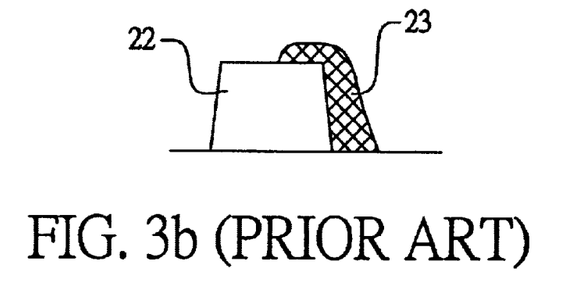
Figure 4A:
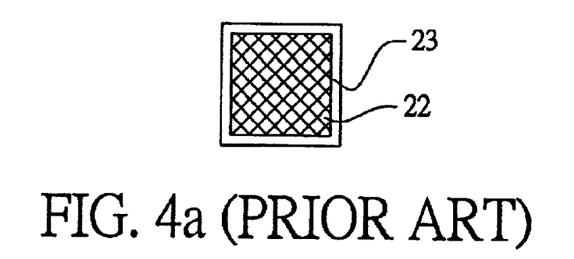
FIGS. 4a and 4b are a top view and a cross sectional view of a stacked color filter spacer, respectively.
Figure 4B:
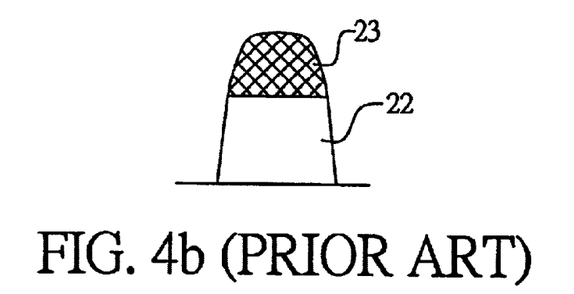
Figure 5A:
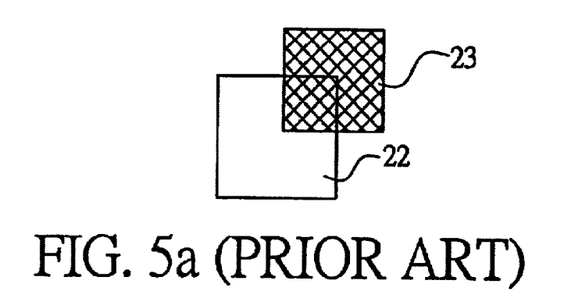
FIGS. 5a and 5b are a top view and a cross sectional view of a stacked color filter spacer, respectively, in which the two stacked color filters are parallel misaligned with each other.
Figure 5B:
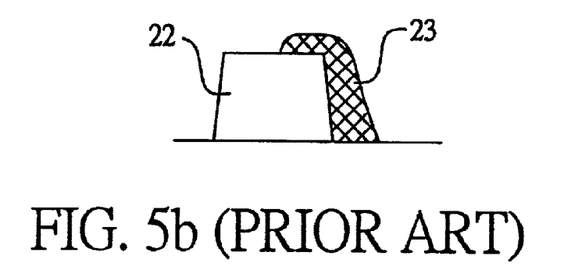

Furthermore, referring to FIGS. 2 to 4, they depict a variety of the stacked color filter spacers. The spacers shown in FIGS. 2a, 2b and 4a, 4b, which are formed by stacked color filters 22, 23 are in the shape of a pillar and a rectangle, respectively. However, the color filter is formed on the substrate of the LCD device by the process of applying, exposing and developing a color filter resin disposed on the substrate. The uppermost color filter 22 may not be precisely positioned with respect to the lower color filter 23 due to misaligning in the above mentioned process, and then flows down in the sequent process of high temperature, so the height of the spacer is varied, as shown in FIGS. 3a, 3b and 5a, 5b, thereby causing the uneven cell gap and generating the Mura defect.

Accordingly, there exist needs for providing a liquid crystal display device having spacers with uniform height to maintain the uniform and precise cell gap between the two glass substrates of liquid crystal display device in order to substantially reduce the Mura defect.

SUMMARY OF THE INVENTION

It is a primary object of the present invention to provide a liquid crystal display device having spacers with uniform height to maintain the uniform and precise cell gap between the two glass substrates of liquid crystal display device so as to substantially reduce the Mura defect.

In order to achieve the objects mentioned hereinabove, the present invention provides a color filter substrate for a LCD device. The color filter substrate comprises a transparent substrate having a substantially flat surface, a black matrix, a plurality of color filters, an electrode, a plurality of spacers, and an alignment film. The black matrix is formed on predetermined regions of the substrate. The color filter portion having colored layers of plural colors disposed on the transparent substrate. The plurality of spacers each having a first spacer member and a second spacer member, wherein the first spacer member and the second spacer member are formed by different layers both in the shape of a parallel construction, and overlap and intersect at a predetermined angle such that each of the spacers has an uniform height.

In one embodiment of the invention, the first spacer member and second spacer member are formed by different color layers, and the electrode is formed over the black matrix, the color filters and the spacers.

In another embodiment of the invention for MVA LCD, the color filter substrate further comprises domain regulating means, such as protrusion patterns, and the first spacer member is formed by a color layer and the second spacer is formed by a part of protrusion patterns. The electrode is formed over first spacer member and under protrusion patterns.

In another aspect according to the present invention, there is provided a color filter substrate wherein the predetermined angle is 90 degree.

In further aspect according to the present invention, there is provided a color filter substrate wherein the parallel construction is a rectangle and a parallelogram.

In still further aspect according to the present invention, there is provided a color filter substrate wherein the spacers are positioned on the regions of the black matrix.

In still further aspect according to the present invention, there is provided a color filter substrate wherein the spacers are positioned on the regions opposite to the storage capacitors on TFT substrate.

In the process of forming the spacers., the alignment accuracy between mask and glass substrate has a great influence on the alignment of two spacer members. In general, the aligner for photo-resist expose process comes across two types of misalignment between photomask and color filter glass. One is occurring in parallel shift and the other is happening in rotating movement. The margin error of parallel shift is within the range of ±3 µm and the rotation is almost 0 degree, so there is almost no rotational misalignment. The parallel misalignment has no effect on the height of the intersected portions of two parallel constructions according to the present invention. Therefore, the spacers are uniform in the overall glass substrate, thereby substantially reducing the Mura defect mainly due to irregular cell gap.

BRIEF DESCRIPTION OF THE DRAWINGS

Other objects, advantages, and novel features of the invention will become more apparent from the following detailed description when taken in conjunction with the accompanying drawings.

DESCRIPTION OF THE PREFERRED EMBODIMENT

The present invention will now be described more fully hereinafter with the color filter substrate of the thin film transistor liquid crystal display (TFT LCD) device by way of an example, but it should be noted that the spirit and the scope of the present invention will not be limited thereto.

Figure 6A:
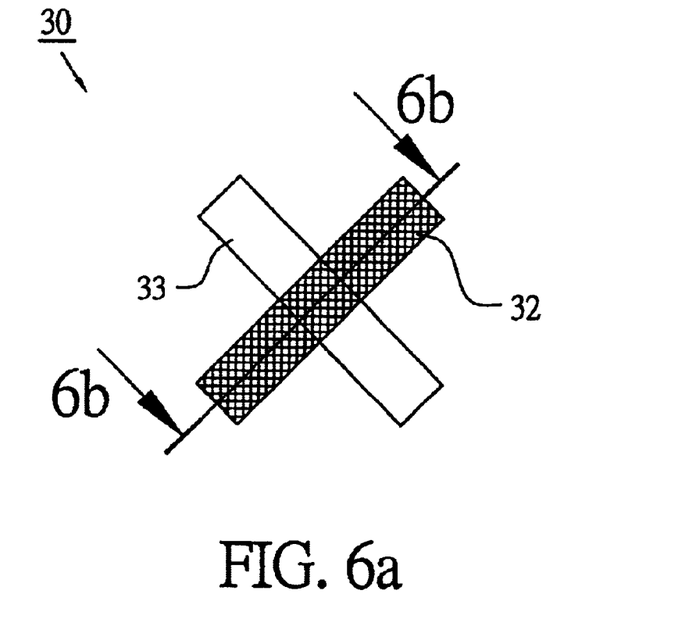
FIGS. 6a and 6b are a top view and a cross sectional view of a stacked color filter spacer of an embodiment according to the present invention, respectively.
Figure 6B:
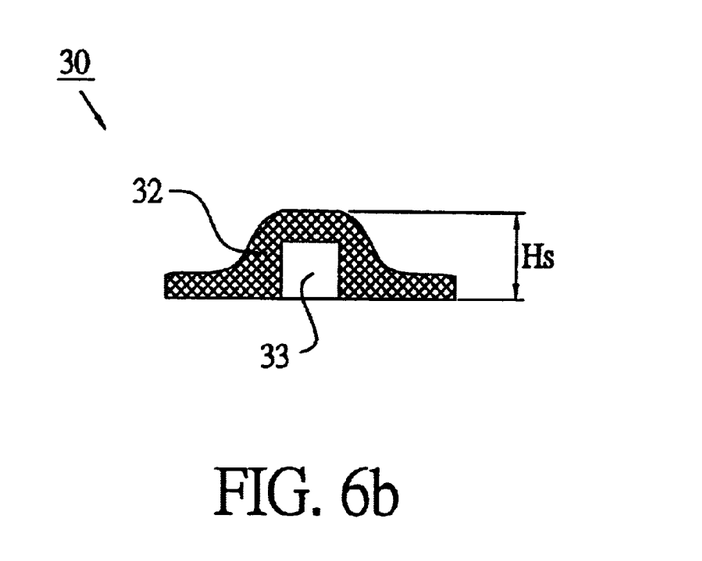

As shown in FIGS. 6a and 6b, they depict a stacked color filter spacer 30 that is constructed as two stacked color filter layers 32, 33. The two color filter layers 32, 33 are in shape of a rectangle and are intersectionally stacked with each other to form a height Hs of the spacer 30. In this case, since the two color filter layers 32, 33 of the spacer 30 are rectangular and intersectionally stacked to form the spacer 30 having a substantial constant area even if the two color filter layers 32, 33 are parallel misaligned. The constant stacked area or overlap area of the two color filter layers 32, 33 results in a constant height Hs of the spacer 30, and the problem of the uneven cell gap in prior art can be substantially solved.

Furthermore, although the two color filter layers 32, 33 shown in the drawings are formed in a shape of a rectangle and are overlappingly intersected at a right angle, the two color filter layers 32, 33 can be formed in another shape and be overlappingly intersected at any angle. It is the spirit of the present invention that the color filters having substantially an elongated parallel construction are provided and are used to form the spacers by staking, and thus the spacers have a substantially constant stacked area and result in a constant height thereof even if the stacked color filters are misaligned. Therefore, the color filters used to be stacked can be in any shape that have a parallel construction, such as rectangle and parallelogram.

Figure 7:
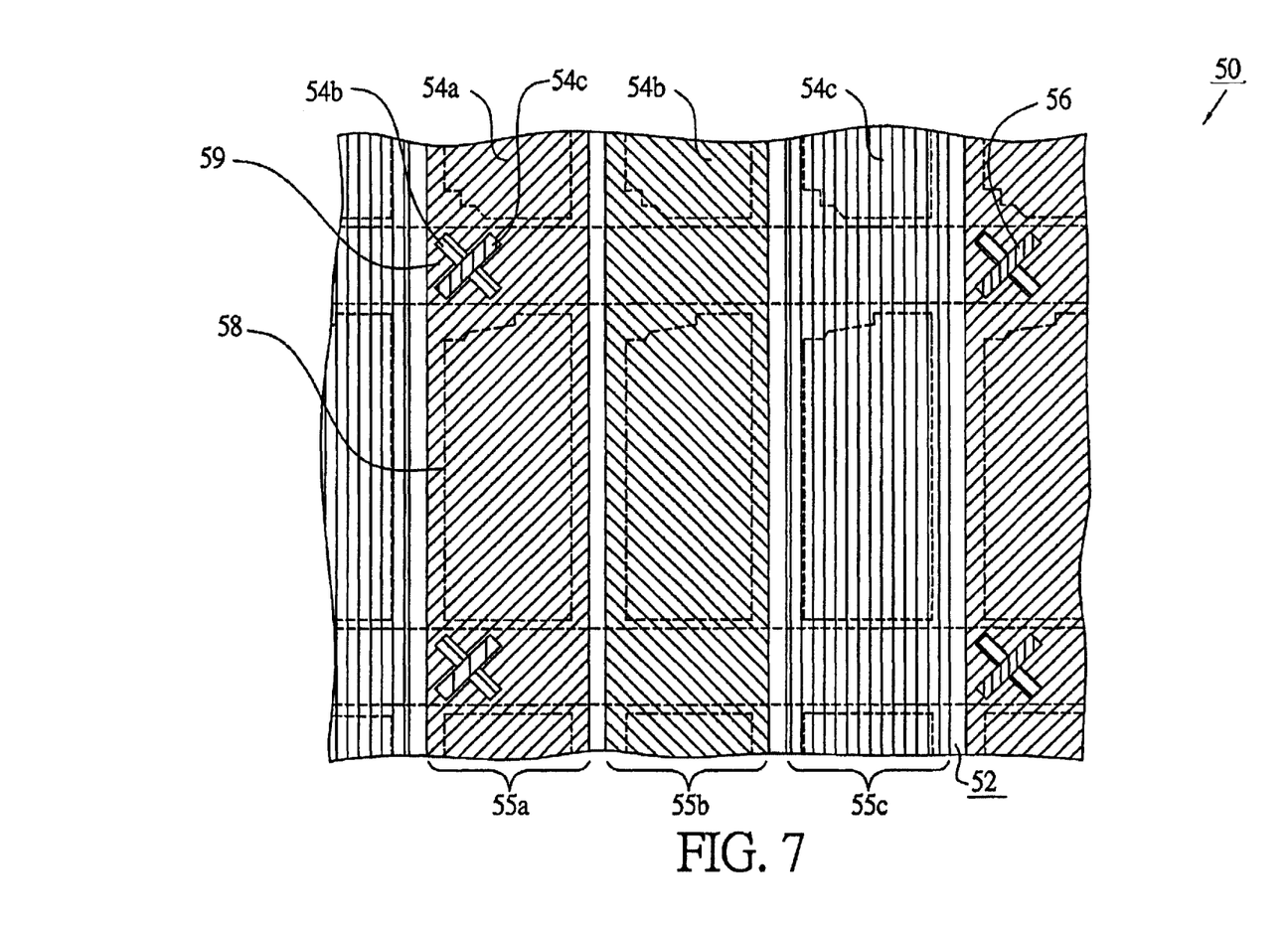
FIG. 7 is a top view of a color filter substrate of a preferable embodiment according to the present invention.

Now referring to FIG. 7, it depicts a color filter (CF) substrate 50 of a liquid crystal display (LCD) device according to an embodiment of the present invention. The color filter substrate 50 is attached to a thin film transistor (TFT) substrate for forming the LCD device. The CF substrate 50 includes a glass substrate 52, a plurality of color filters 54a, 54b, 54c, typically consisting of red, green and blue color filters formed on the glass substrate 52, and a plurality of spacers 56.

As shown in the FIG. 7, the color filters 54a, 54b, 54c cover the active regions 58 of the LCD device (shown as the dot lines), which is correspondent to the pixel electrodes on the TFT substrate, and the spacers 56 are positioned on the inactive region 59 of the LCD device, which is correspondent to the drain lines, the gate lines, the storage capacitance electrodes and the TFTs on the TFT substrate. The spacers 56 are formed by stacking any two filters of the color filter 54a, 54b, 54c.

Normally, each of the color filters 54a, 54b, 54c are striped arranged and formed on the substrate in turn. First, the color filter 54a is formed in a striped pattern on the region 55a. Then, the color filter 54b is formed into a striped pattern on the region 55b and into rectangles on the regions 55a. Last, the color filter 54c is formed into a stripe pattern on the region 55c and into rectangles on the regions 55a. All of the rectangular color filters are overlappingly intersected at an angle and are stacked for forming the spacers 56 in a constant height.

It should be understood by those skilled in the art that an electrode 53 and an alignment film 57 formed of ITO (Indium Tin Oxide) and polyamic acid, respectively, can be further applied over the glass substrate 52 in turn. The surface of the alignment film is subjected to the rubbing process for aligning the liquid crystal molecule.

Furthermore, in a preferable embodiment, the longitudinal direction of the rectangular color filters 54a, 54b, 54c are inclined with respect to the longitudinal direction of the LCD device at an angle of 45° and 135°, and thus are overlappingly intersected with each other at an angle of 90°. Therefore, while the rectangular color filters 54a, 54b, 54c are misaligned during forming, the intersectionally stacked area thereof and the height of the spacers can still be kept uniform.

As mentioned above, it is understood that in an alternate embodiment, the stacked color filters can be intersected at any angle and the rectangular color filters can be replaced with the color filter in the shape of a parallel construction, such as parallelogram.

Figure 8:
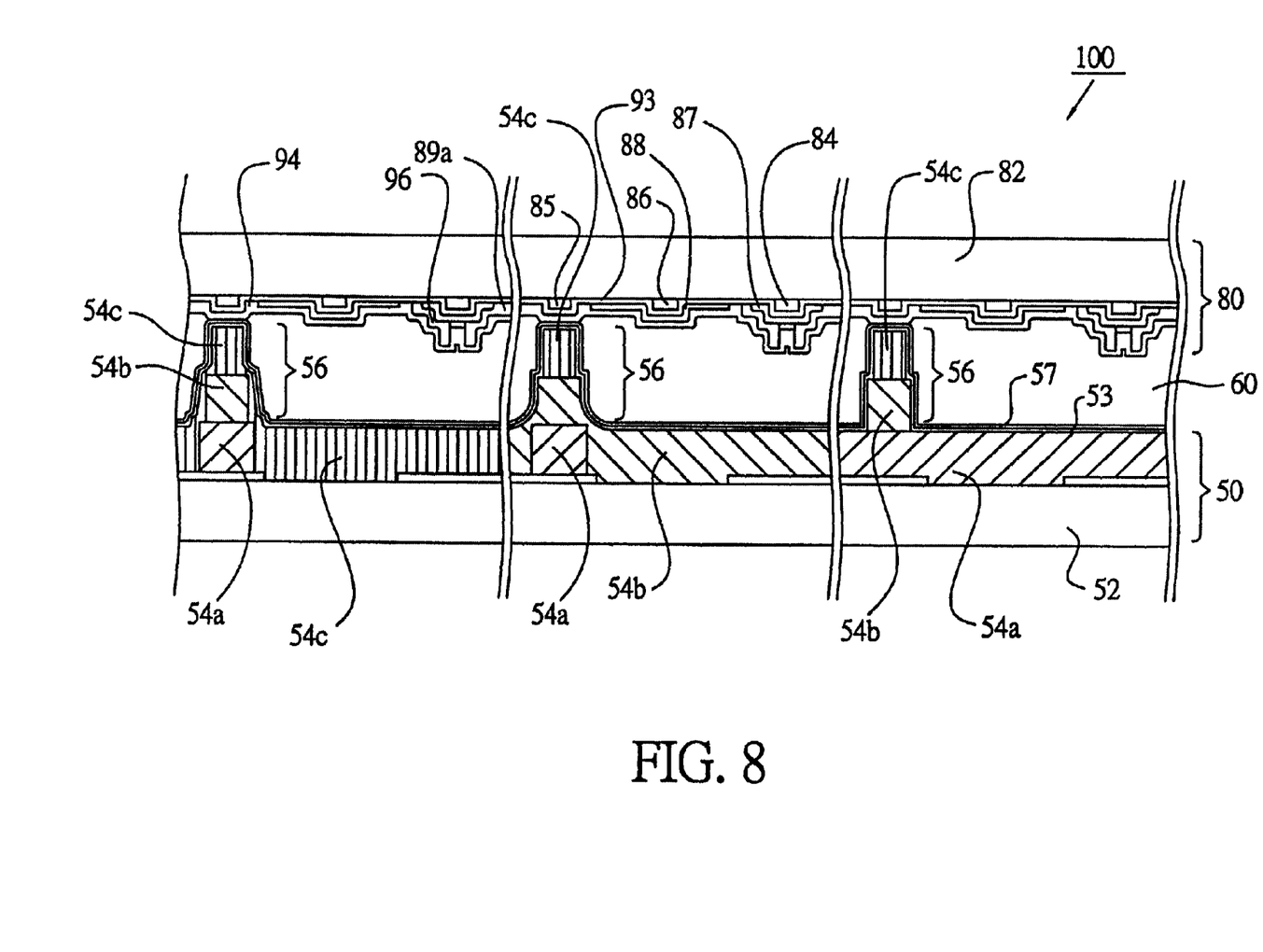
FIG. 8 is a cross sectional view of a liquid crystal display device of a preferable embodiment according to the present invention.

Now again referring to FIG. 8, it depicts a liquid crystal display (LCD) device 100 according to the present invention. The LCD device 100 includes the color filter (CF) substrate 50 and a thin film transistor (TFT) substrate 80, and the edge portions of the CF substrate 50 and the TFT substrate 80 are adhered together to define a cavity for receiving the liquid crystal material 60. The cavity has a uniform and precise gap (cell gap) defined by means of a plurality of spacers 56. The structure of the TFT substrate 80 is described below. On a glass substrate 82, gates 84, gate lines (scanning lines) 85 and storage capacitance lines 86 are respectively formed. The gates 84, the gate lines 85 and the storage capacitance lines 86 are covered by an insulating film 93. A semiconductor layer 87 serving as channel of TFT (Thin Film Transistor) is formed on each gate 84 through the insulating film 93. Moreover, metal layers 89a, 89b serving as source and drain regions of the TFT are formed at the upper portion of each semiconductor layer 87 and connected to source lines and pixel electrodes 88. Further, the pixel electrode 88 comprised of, e.g., ITO is formed in a manner to cover each storage capacitance line 86 through the insulating film 93. In addition, an alignment film 94 is formed on the source and drain regions 89a, 89b and each pixel electrode 88.

Furthermore, when the CF substrate according to the present invention is applied to an LCD of vertically-aligned (VA) type, the CF substrate can be provided with a domain regulating means for regulating the orientation of a liquid crystal, such as protrusions formed on the CF substrate. The VA LCD with domain regulating means is disclosed in the European Patent Publication Number 0884626-A2 incorporated herein by reference.

Figure 9:
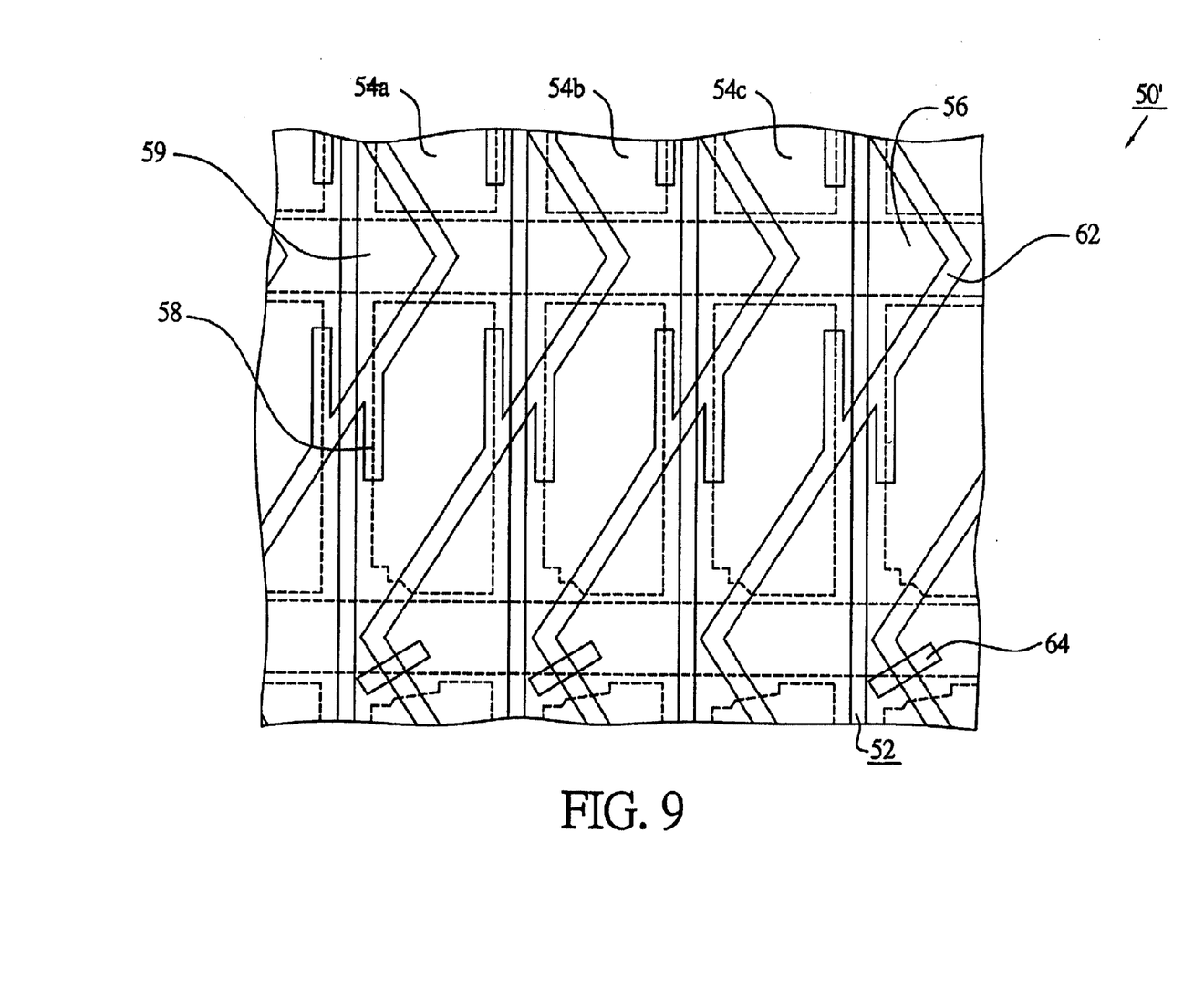
FIG. 9 is a top view of a color filter substrate of another preferable embodiment according to the present invention.

As shown in FIG. 9, it depicts a color filter (CF) substrate 50' of a liquid crystal display (LCD) device according to another embodiment of the present invention. The color filter substrate 50' is substantially similar to the CF substrate 50; however, the CF substrate 50' is applied to an LCD of vertically-aligned (VA) type, and the CF substrate 50' is provided with a plurality of protrusion patterns 62. The CF substrate 50' is also provided with rectangles 64 of the color filters on the inactive regions thereof, similar to the rectangular color filters of the CF substrate 50. An electrode formed of ITO (not shown) is applied over the substrate 50'. Then, the protrusion patterns 62 of the CF substrate 50' are intersected with and stacked on the rectangles 64 for forming the spacer. Finally, an alignment film (not shown) is further applied over the glass substrate 50'.

As mentioned above, the spacers according to the present invention are formed by two rectangles intersecting at an angle, and each of the rectangles may be formed by the color filter, the protrusion pattern or other structure with a predetermined height on the CF substrate, so that the stacked area of the two rectangles are constant and the height of the spacers formed by the stacking rectangles is therefore constant. Accordingly, the cell gap can be kept uniform, thereby substantially reducing the Mura defect.

Although the invention has been explained in relation to its preferred embodiment, it is to be understood that many other possible modifications and variations can be made without departing from the spirit and scope of the invention as hereinafter claimed.

What is claimed is:

1. A color filter substrate for a liquid crystal display device comprising:

a transparent substrate having a substantially flat surface, defining a first, a second, and a third regions thereon and formed as a substantial rectangle defining a display longitudinal direction;

a black matrix formed on predetermined regions of the substrate; and a color filter portion having a plurality of colored layers disposed on the transparent substrate, wherein a first colored layer is disposed on the first region for forming a portion of color filter, and a second colored layer is disposed on the second region for forming a portion of color filter and shaped on the first region of the substrate into a plurality of first parallel constructions, and a third colored layer is disposed on the third region for forming a portion of the color filter and shaped on the first region of the substrate into a plurality of second parallel constructions, the first parallel constructions and the second parallel constructions overlap and intersect with each other at a predetermined angle to form a plurality of spacers such that each of the spacers has an uniform height.

2. A color filter substrate as claimed in claim 1, wherein the predetermined angle is about 90 degree.

3. A color filter substrate as claimed in claim 1, wherein the first parallel constructions are formed in parallel, the second parallel constructions are formed in parallel, and the longitudinal directions of the first parallel constructions and the second parallel constructions are respectively inclined with respect to the display longitudinal direction at an angle of about 45° and 135°.

4. A color filter substrate as claimed in claim 1, wherein the spacers are disposed on the regions of the black matrix.

5. A color filter substrate as claimed in claim 1, wherein the liquid crystal display device comprising a thin film transistor substrate with storage capacitors, and the spacers are disposed on the regions opposite to the storage capacitors.

6. A liquid crystal display device comprising:
a thin film transistor substrate comprising thin film transistors, storage capacitors, gate and source lines and an alignment film;
a color filter substrate comprising:
a transparent substrate having a substantially flat surface, defining a first, a second, and a third regions thereon and formed as a substantial rectangle defining a display longitudinal direction;
a black matrix formed on predetermined regions of the substrate;
a color filter portion having a plurality of colored layers disposed on the transparent substrate, wherein a first colored layer o is disposed on the first region for forming a portion of color filter and a second colored layer is disposed on the second region for forming a portion of color filter and shaped on the first region of the substrate into a plurality of first parallel constructions, and a third colored layer is disposed on the third region for forming a portion of color filter, and shaped on the first region of the substrate into a plurality of second parallel constructions, the first parallel constructions and the second parallel constructions overlap and intersect with each other at a predetermined angle to form a plurality of spacers;
an electrode formed over the black matrix, the color filter portion and the spacers; and
an alignment film for aligning the liquid crystal molecular formed over the regions of the black matrix, the color filter portion, the electrode, and the spacers, and
a liquid crystal material sandwiched between the color filter substrate and the thin film transistor substrate.

7. A liquid crystal display device as claimed in claim 6, wherein the predetermined angle is about 90 degree.

8. A liquid crystal display device as claimed in claim 6, wherein the first parallel constructions are formed in parallel, the second parallel constructions are formed in parallel, and the longitudinal directions of the first parallel constructions and the second parallel constructions are respectively inclined with respect to the display longitudinal direction at an angle of about 45° and 135°.

9. A liquid crystal display device as claimed in claim 6, wherein the spacers are disposed on the regions of the black matrix.

10. A liquid crystal display device as claimed in claim 6, wherein the spacers are disposed on the regions opposite to the storage capacitors.

11. A color filter substrate for a liquid crystal display device comprising:
a transparent substrate having a substantially flat surface;
a black matrix formed on predetermined regions of the substrate;
a color filter portion having a plurality of colored layers disposed on the transparent substrate; and
a plurality of spacers each having a first spacer member and a second spacer member, wherein the first spacer member and the second spacer member are formed by different layers in the shape of a parallel construction, and intersect at a predetermined angle such that each of the spacers has an uniform height.

12. A color filter substrate as claimed in claim 11, wherein the spacer members are formed by the colored layers.

13. A color filter substrate as claimed in claim 12, wherein the substrate further comprising an electrode formed over the spacers.

14. A color filter substrate as claimed in claim 11, wherein the color filter substrate further comprising a plurality of protrusion patterns for regulating the orientation of a liquid crystal material, and the first spacer member is formed by one colored layer and the second spacer member is a part of protrusion patterns.

15. A color filter substrate as claimed in claim 14, wherein the substrate further comprising an electrode formed over the first spacer member and under the protrusion patterns.

16. A color filter substrate as claimed in claim 11, wherein the spacers are formed on the color filter portion.

17. A color filter substrate as claimed in claim 11, wherein the liquid crystal display device comprising a thin film transistor substrate with storage capacitors, and the spacers are disposed on the regions opposite to the storage capacitors.

18. A color filter substrate as claimed in claim 11, wherein the predetermined angle is about 90 degree.

19. A color filter substrate as claimed in claim 11, wherein the spacers are disposed on the regions of the black matrix.

20. A color filter substrate for a liquid crystal display device comprising:
a transparent substrate having a substantially flat surface;
a black matrix formed on predetermined regions of the substrate;
a color filter portion having a plurality of colored layers disposed on the transparent substrate;
a plurality of protrusion patterns for regulating the orientation of a liquid crystal;
a plurality of spacers each formed by stacking a spacer member with the protrusion patterns wherein the spacer member is formed by the colored layer in the shape of a parallel construction, and the spacer member and the protrusion patterns cross at a predetermined angle such that each of the spacers has a uniform height.

21. A color filter substrate as claimed in claim 20, wherein the substrate further comprising an electrode formed over the spacer member and under the protrusion patterns.

22. A color filter substrate as claimed in claim 20, wherein the spacers are formed on the color filter portion.

23. A liquid crystal display device as claimed in claim 20, wherein the liquid crystal display device comprising a thin film transistor substrate with storage capacitance, and the spacers are disposed on the regions opposite to the storage capacitors.

24. A color filter substrate as claimed in claim 20, wherein the predetermined angle is about 90 degree.

25. A color filter substrate as claimed in claim 20, wherein the spacers are disposed on the regions of the black matrix.

26. A spacer structure deposited on a color filter substrate of a liquid crystal display for keeping a cell gap thereof comprising:
two members respectively having a first parallel construction and a second parallel construction intersected with each other at a predetermined angle so as to form a predetermined height of the spacer structure.

27. A spacer structure as claimed in claim 26, wherein the color filter substrate has a plurality of colored layers, and the two members are formed by the color layers.

28. A spacer structure as claimed in claim 26, wherein the color filter substrate has a plurality of colored layers and protrusion patterns for regulating the orientation of a liquid crystal material, and one of the two member is formed by the color layers and the other is formed by the protrusion patterns.

29. A spacer structure as claimed in claim 26, wherein the predetermined angle is 90°.

* * * * *